United States Patent
Ranta-aho et al.

(10) Patent No.: US 9,867,087 B2
(45) Date of Patent: Jan. 9, 2018

(54) CONFIGURING A COMMUNICATION WITH USER EQUIPMENTS OPERATING WITH A DIFFERENT SYSTEM BANDWIDTH

(75) Inventors: Karri Markus Ranta-aho, Espoo (FI); Antti Anton Toskala, Espoo (FI); Timo Erkki Lunttila, Espoo (FI); Woonhee Hwang, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 136 days.

(21) Appl. No.: 14/348,218

(22) PCT Filed: Sep. 28, 2011

(86) PCT No.: PCT/EP2011/066869
§ 371 (c)(1),
(2), (4) Date: Jun. 16, 2014

(87) PCT Pub. No.: WO2013/044948
PCT Pub. Date: Apr. 4, 2013

(65) Prior Publication Data
US 2015/0146629 A1    May 28, 2015

(51) Int. Cl.
*H04W 28/20*    (2009.01)
*H04W 72/04*    (2009.01)
(Continued)

(52) U.S. Cl.
CPC ............. *H04W 28/20* (2013.01); *H04L 5/005* (2013.01); *H04L 5/0028* (2013.01); *H04L 5/0053* (2013.01); *H04L 5/0092* (2013.01); *H04W 4/005* (2013.01); *H04W 72/0453* (2013.01); *H04L 5/0057* (2013.01); *H04L 5/0064* (2013.01)

(58) Field of Classification Search
None
See application file for complete search history.

(56) References Cited

U.S. PATENT DOCUMENTS

| | | | |
|---|---|---|---|
| 2010/0120442 A1* | 5/2010 | Zhuang | H04B 7/15507 455/450 |
| 2011/0085457 A1* | 4/2011 | Chen | H04L 1/1812 370/252 |
| 2011/0177807 A1* | 7/2011 | Cho | H04W 72/042 455/422.1 |

OTHER PUBLICATIONS

Seidel, Eiko, "Progress on 'LTE Advanced'—the new 4G standard", Nomor Research GmbH, Munich, Germany, Jul. 24, 2008, 3 pgs.

* cited by examiner

*Primary Examiner* — Chirag Shah
*Assistant Examiner* — Srinivasa Reddivalam
(74) *Attorney, Agent, or Firm* — Harrington & Smith

(57) ABSTRACT

A method configures a communication between a base station, a first user equipment adapted to operate with a first system bandwidth and a second user equipment adapted to operate with a second system bandwidth. The first system bandwidth is broader than the second system bandwidth. The base station, the first user equipment and the second user equipment are located within a cellular network system. The method includes providing first common channels or signals within the first system bandwidth and providing second common channels or signals within the second system bandwidth, wherein a part of the first common channels or signals and a part of the second common channels or signals are superpositioned. The method further includes configuring at least one of the common channels or signals of the part of the first common channels or signals to be used by the first user equipment and the second user equipment.

16 Claims, 2 Drawing Sheets

(51) Int. Cl.
*H04L 5/00* (2006.01)
*H04W 4/00* (2009.01)

1 TTI (1 ms)

CONFIGURING A COMMUNICATION WITH USER EQUIPMENTS OPERATING WITH A DIFFERENT SYSTEM BANDWIDTH

FIELD OF THE INVENTION

The present invention relates to the field of cellular communication networks and in particular to cellular communication networks which handles two systems with different frequency bandwidths.

BACKGROUND OF THE INVENTION

In 3GPP, it has been raised that devices or terminals designed for the MTC (machine type communication) use in LTE (3GPP Long-Term Evolution) should for cost efficiency reasons have more limited capabilities than regular LTE terminals or devices. One of the aspects discussed has been the support for smaller maximum system bandwidth than currently assumed. The LTE system design, including the physical downlink control channel (PDCCH), assumes all terminals being capable of receiving the full bandwidth. Since the PDCCH controls both user data transmission as well as part of the signaling traffic transmission (including some system information and paging information), an MTC device having a lower maximum system bandwidth capability could not access the system running with larger than this lower bandwidth.

In view of the above-described situation, there exists a need for an improved technique that enables to provide a cellular communication system substantially avoiding or at least reducing one or more of the above-identified problems. Hence, a system or method being able to provide efficient and improved transmission for regular devices and MTC devices may be needed.

SUMMARY OF THE INVENTION

This need may be met by the subject matter according to the independent claims. Advantageous embodiments of the herein disclosed subject matter are described by the dependent claims.

According to a first aspect of the herein disclosed subject matter, there is provided a method for configuring a communication between a base station, a first user equipment being adapted to operate with a first system bandwidth and a second user equipment being adapted to operate with a second system bandwidth, wherein the first system bandwidth is broader than the second system bandwidth and wherein the base station, the first user equipment and the second user equipment are located within a cellular network system. The method comprises providing first common channels or signals within the first system bandwidth, providing second common channels or signals within the second system bandwidth, wherein a part of the first common channels or signals and a part of the second common channels or signals are superpositioned, and configuring at least one of the common channels or signals of the part of the first common channels or signals to be used by the first user equipment and the second user equipment.

This aspect may relate in particular to machine type communication (MTC) of LTE terminals and their operation in LTE radio networks with larger bandwidth capability than what the MTC terminals could support. The described method may provide basic functionality necessary for enabling system access and scheduling for the MTC UEs in such a scenario.

As already mentioned above, in 3GPP it has been raised that terminals designed for the MTC use in LTE should for example for cost efficiency reasons have more limited capabilities than regular LTE terminals. One of the aspects discussed has been the support for smaller maximum system bandwidth than currently assumed.

The LTE system design normally assumes all terminals being capable of receiving the full bandwidth, which may be in one embodiment 20 MHz. A user equipment (UE) with a smaller maximum system bandwidth capability, in one embodiment for example 5 MHz could not access the system running with a larger system bandwidth.

The term "system bandwidth" may refer to the system bandwidth capability of a UE. It should be noted that the instantaneous bandwidth (BW) of a UE should be distinguished from the capability. In current LTE releases, common UEs may be capable of receiving for example 20 MHz system BW at maximum, but the eNodeB or base station may (and typically will) schedule them less than that. However, specific channels like PDCCH, PHICH and PCFICH might always be transmitted with full system BW (for example with 1.4, 3, 5, 10, 15, 20 MHz).

An MTC device (as explained further below) or any other kind of bandwidth limited device may have a max system BW capability of only e.g. 5 MHz and it may not necessarily be able to receive the aforementioned channels if the "ordinary" system BW is more than that. Thus, the idea of the present embodiment is to provide a method being able to deal with the different requirements being raised by common devices as well as bandwidth limited devices.

In common systems, the LTE system may be operated in such a case with multiple carriers (e.g. one 5 MHz carrier and one 15 MHz carrier) to deal with such a terminal limitations. This would however limit the maximum available data rates and overall system capacity quite severely. For instance, terminals might not be capable of performing carrier aggregation, and this kind of arrangement would limit also the system bandwidth of the regular devices to a lower system bandwidth, for example 15 MHz, which would be very hard to justify. Moreover, the flexibility in the resource sharing between MTC and other UE would be lost to a large extent.

Another possibility would be to have the two systems (e.g. 20 MHz and 5 MHz) superpositioned on top of each other in frequency and run them independently. This would, however, mean significant interference among the two systems. Especially the common reference symbols become problematic, as they would either fully overlap, or otherwise be interfered by the data, making robust system operation nearly impossible.

Hence, the basic idea of the present invention is to provide a method being able to provide a communication possibility or transmission for MTC devices, or more general user equipments having a lower maximum system bandwidth capability, and regular devices, i.e. user equipments having a broader maximum system bandwidth capability. Such a method may be characterized by the above mentioned features.

The proposed method may provide a combination of a broadband system (first common channels and first user equipment) and a narrowband system (second common channels and second user equipment). Both systems may share at least one common channel in order to reduce interference as the number of needed channels for each system may be reduced.

An LTE system may have several channel types: physical channels, transport channels, and logical channels. Channels can be classified as common channels or dedicated channels. Common channels are accessible and shareable by a variety of communication devices. The UMTS LTE system uses common channels to send commands or instructions, such as system or device identification information, to all mobile devices operating in a radio coverage area.

The term "superpositioning" in this context, also called superimposing, may denote superimposing of two or more systems with different system bandwidths. This may denote that the two systems are located on the same physical resource blocks. Superposition may denote an overlay, or one system placed on top of another system, sharing the same physical resource blocks (not necessarily the same symbols though).

The narrower bandwidth (BW) system may operate on a spectrum chunk that resides completely inside the broader BW system spectrum. In one specific embodiment, the broader BW system may be a 20 MHz cell and may be located in 2000-2020 MHz, wherein the narrower BW system may be a 5 MHz cell and may be located in 2005-2010 MHz. This might need to be done in such a way that common 20 MHz devices can work in the 20 MHz cell normally without any knowledge of the 5 MHz system "superpositioned" inside the same spectrum.

The base station may be any kind of base station or eNodeB being able to provide the above mentioned functionalities. The first user equipment may be a regular LTE device being able to operate within the first system bandwidth. The second user equipment may be a MTC device. Machine type communication (MTC) is a form of data communication which involves one or more entities that do not necessarily need human interaction. MTC devices may be user equipments equipped for MTC. MTC devices may be used for example for automatic emergency calls. Of course, user equipments being adapted to operate within the second (narrower) bandwidth system may be any kind of user equipments being assigned to a narrower bandwidth system.

According to an embodiment of the invention, the method further comprises separating the part of the first common channels or signals and the part of the second common channels or signals in time.

This may denote that the part of the first common channels or signals and the part of the second common channels or signals are timely offset in respect to each other. According to this embodiment, interferences between the two systems may be further reduced.

According to a further embodiment of the invention, the method further comprises separating the part of the first common channels or signals and the part of the second common channels or signals in frequency.

This may denote that the reference symbols are separated with a shift of 1 to 2 subcarriers. But nevertheless the systems may be still superpositioned, even if some channels/signals are not.

According to a further embodiment of the invention, the first common channels or signals and the second common channels or signals each comprise at least one of the group consisting of a physical downlink control channel PDCCH), a physical hybrid ARQ indicator channel (PHICH), a physical control format indication channel (PCFICH) and a physical broadcast channel (PBCH).

These channels may be known common channels, wherein the channels used for the narrowband system may be based on the channel structure and functionality of the channels of the broadband system. The narrowband common channels may nevertheless provide less functionality as the broadband common channels, as they are used for MTC devices.

According to a further embodiment of the invention, the at least one of the common channels or signals of the part of the first common channels or signals to be used by the first user equipment and the second user equipment is at least one of the group consisting of a primary synchronization signal (PSS) and a secondary synchronization signal (SSS).

According to this embodiment, a specific part of the common signals may be shared between the narrowband (second common signals) and the broadband system (first common signals).

According to a further embodiment of the invention, the method further comprises configuring the part of the first common channels or signals and the part of the second common channels or signals to share at least one common symbol.

By sharing at least one common symbol, the control channel overhead of the overall system may be reduced. The shared symbol(s) may be for example symbol(s) comprising information used for both systems.

According to a further embodiment of the invention, the at least one common symbol is at least one of reference symbols included into a common reference signal (CRS) or a channel state information reference signal (CSI-RS).

These symbols may comprise information for both systems. By sharing these symbols, the overload may be reduced. Reference signals (CRS or CSI-RS which spans the whole system BW) consist of reference symbols. The two systems (narrow and wide BW) may share some of the reference symbols.

According to a further embodiment of the invention, the method further comprises allowing transmission on the second common channels or signals within a predefined duty cycle.

The overhead due to MTC operation may be further reduced by allowing for a duty cycle for the transmission of MTC common channels, i.e. transmitting them in only a predefined subset of all subframes. The duty cycle may be defined before transmission.

According to a second aspect of the invention, a base station is provided for configuring a communication between the base station, a first user equipment being adapted to operate with a first system bandwidth and a second user equipment being adapted to operate with a second system bandwidth, wherein the first system bandwidth is broader than the second system bandwidth and wherein the base station, the first user equipment and the second user equipment are located within a cellular network system. The base station comprises a control unit being adapted to provide first common channels or signals within the first system bandwidth and to provide second common channels or signals within the second system bandwidth, wherein a part of the first common channels or signals and a part of the second common channels or signals are superpositioned, and a configuration unit being adapted to configure at least one of the common channels or signals of the part of the first common channels or signals to be used by the first user equipment and the second user equipment.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting unit, for example a transmitter. The receiver and the transmitter may be implemented as one single unit, for example as a transceiver. The transceiver or the receiving unit and the transmitting unit may be adapted to communicate with a further base station or the user equipments via an antenna.

The control unit and the configuration unit may be implemented as single units or may be one unit being implemented for example as part of a standard control unit, like a CPU or a microcontroller.

A user equipment (UE) in the context of this description may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station.

The user equipment may further comprise a transmitting unit for transmitting signal. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The second user equipment in the context of this description may comprise similar units and provide similar functionalities as the above described user equipment. In addition, the second user equipment may be an MTC device as described above.

According to a third aspect of the invention, a cellular network system for configuring a communication channel between a base station and a user equipment within the cellular network system, the cellular network system comprising a least one base station as described above.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for configuring a communication, is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of configuring a communication channel. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
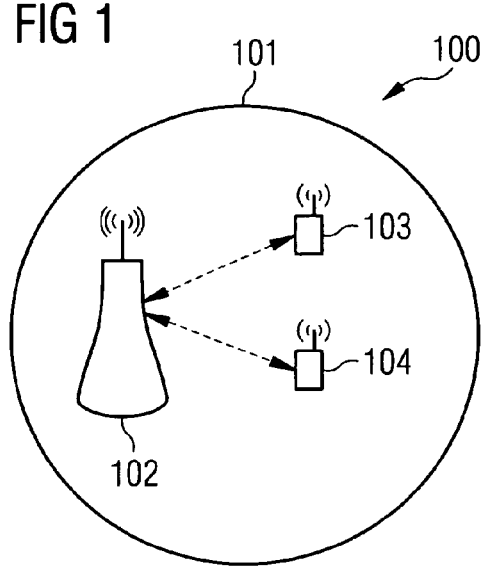
FIG. 1 shows a cellular network system according to an exemplary embodiment of the invention.

The illustration in the drawing is schematically. It is noted that in different figures, similar or identical elements are provided with the same reference signs.

In the following, embodiments of the herein disclosed subject matter are illustrated with reference to the drawings and reference to aspects of current standards, such as LTE. However, such reference to current standards is only exemplary and should not be considered as limiting the scope of the claims.

FIG. 1 shows a cellular network system 100 according to an exemplary embodiment. The cellular network system comprises at least one cell 101. A base station 102 is assigned to this cell. A first user equipment 103 and a second user equipment 104 are served by the base station.

The network system 100 according to this embodiment supports two systems, a broadband system and a narrowband system.

The first user equipment 103 is associated with the broadband system and the second user equipment 104 is associated with the narrowband system. This means that the first user equipment is adapted to operate with a first system bandwidth and the second user equipment is adapted to operate with a second system bandwidth, wherein the first system bandwidth is broader than the second system bandwidth.

The base station 102 provides first common channels or signals within the first system bandwidth and second common channels or signals within the second system bandwidth. The first user equipment may communicate over the broadband channels and the second user equipment, which may be for instance an MTC device, may communicate over the narrowband channels.

To serve the broadband as well as the narrowband system without limiting the broadband system, a part of the first common channels and a part of the second common channels are superpositioned. Further, to avoid or at least reduce interferences between the two systems, both systems share at least partially one of the common channels or signals. This means that at least one of the common channels of the part of the first common channels can be used by the first user equipment and the second user equipment.

In a specific embodiment, the broadband system comprises a PDCCH. For the narrow-band system, a second, narrow-band PDCCH may be introduced within the wider-band LTE cell in order to enable low-cost narrow-band MTC devices to coexist in the same, wider system bandwidth cell with regular LTE devices. A new set of new common channels similar as PDCCH, PHICH, PCFICH and/or PBCH related to the transmission of the narrow system bandwidth may be provided and may be placed on top of a wider bandwidth system. In the following, these channels will be denoted as mPDCCH, mPHICH, mPCFICH, and mPBCH, respectively. These new common channels can be separated from the corresponding common channels used for larger bandwidth in time and/or frequency. Furthermore, the physical DL shared data channel scheduled by the mPDCCH will be denoted in the following the mPDSCH. Further, the two bandwidths/systems ("the legacy LTE" and "MTC") may also share at least partially some of the common channels/signals such as the CRS, CSI-RS or PSS/SSS.

The location on the mPDCCH, mPCFICH, and mPHICH could be fixed starting from a predefined OFDM symbol within the subframe. For instance the starting point may be the $4^{th}$ OFDM symbol in a subframe guaranteeing that the mPDCCH, mPCFICH and mPHICH do not overlap with PDCCH, PCFICH, or PHICH.

The narrowband mPDCCH informs the MTC device (or user equipment UE) about data reception (on the narrowband PDSCH) as well as about the transmission of the mPBCH MIB information, potentially with longer scheduling period than ordinary PBCH as in many cases the MTC UEs are stationary anyway and with less critical timing requirements for the system access. Synchronizations signals and common reference signals might not be changed, but reference signals may be utilized by the MTC UE for instance in one embodiment for only over the central 5 MHz.

Logically the operation would take place in a single cell with a single Cell ID: however, the MTC UEs receive different system information via mPDCCH and mPBCH. The PDCCH DCI formats can also be aligned with the bandwidth of mPDCCH.

Figure 2:
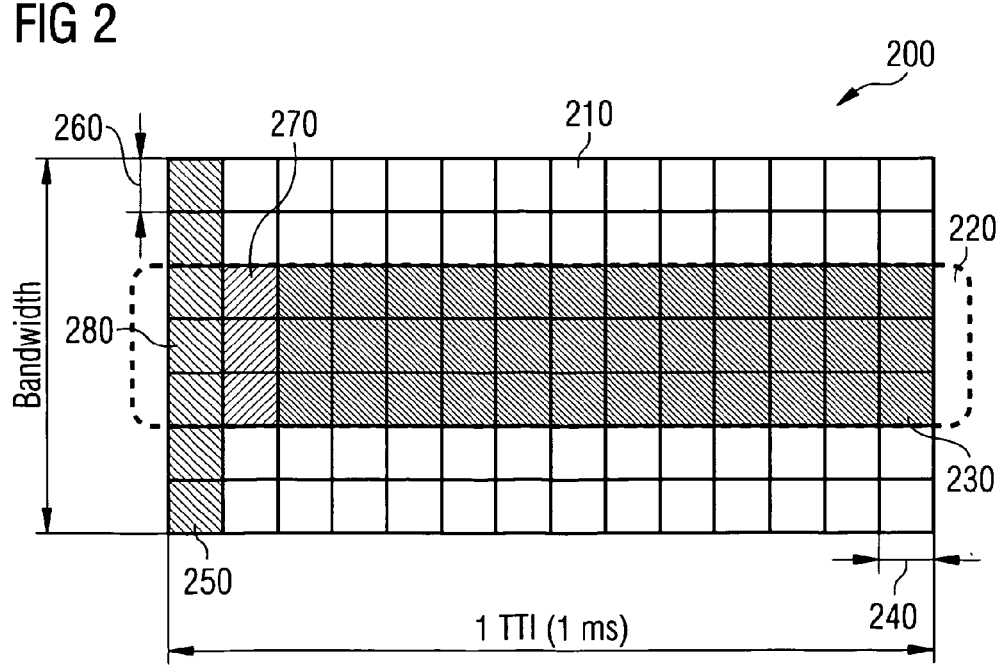
FIG. 2 shows superpositioning of a broadband system and a narrowband system according to an exemplary embodiment of the invention.

An example of the superpositioning of the broadband 210 and the narrowband 220 system is shown in FIG. 2. Note that the narrowband mPDCCH 270 and the mPDSCH 230 it schedules might not need to have the same bandwidth: if the narrowband mPDCCH can be for example over 1.08 MHz only then less restrictions (or impact to capacity) or legacy UEs is introduced.

One square on the bandwidth axis may denote for example six resource blocks 260. One square on the time axis may denote for example one OFDM symbol 240.

The impact to the non-MTC operation is limited to the central PRBs (physical resource blocks). The central PRBs are indicated for example by the reference number 280 in the center PCFICH (for instance 1.08 MHz if the full system bandwidth is equal to n*6*180 kHz). The PDCCH of the full bandwidth system may be assigned to the whole system bandwidth, as denoted by reference number 250.

From the eNodeB (or base station) point of view it just needs to avoid scheduling non-MTC UEs on the PRBs used for MTC operation (i.e. in FIG. 2 the PRBs in the center, indicated by reference number 220). Furthermore, the legacy UEs are not aware of MTC operation at all, as it has no impact on them. The overhead due to MTC operation could be further reduced by allowing for a duty cycle for the transmission of MTC common channels, i.e. transmitting them in only a predefined subset of all subframes.

This predefined subset may follow immediately after the PDCCH and then one may assume the eNodeB scheduling and HARQ handling times (including the timing when uplink feedback is expected) can be kept unchanged compared to the case than there is one slot offset between broadband and narrowband PDCCHs.

Figure 3:
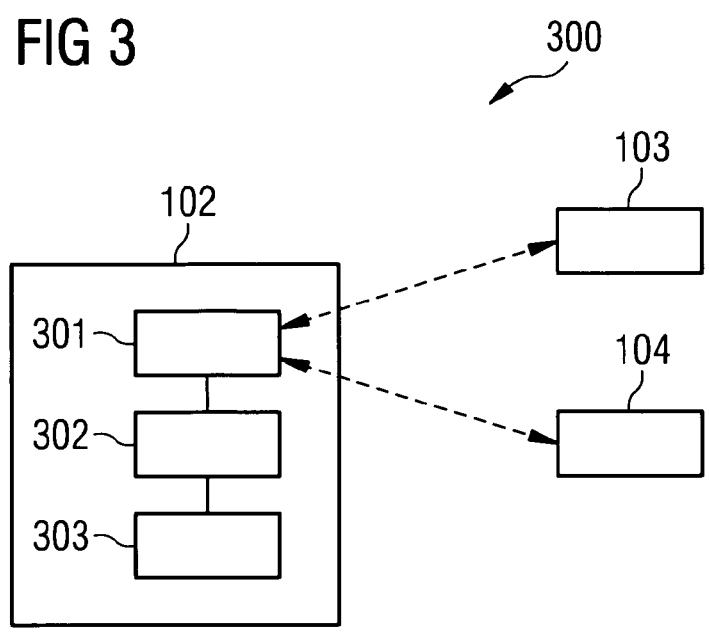
FIG. 3 shows a base station and a first and a second user equipment within a cellular network system according to an exemplary embodiment of the invention.

FIG. 3 shows a cellular network system 300 according to an exemplary embodiment of the invention. The cellular network system comprises a base station 102, a first user equipment 103 and a second user equipment 104.

The base station 102 may be any type of access point or point of attachment, which is capable of providing a wireless access to a telecommunication network. Thereby, the wireless access may be provided for a user equipment 103, 104 or for any other network element, which is capable of communicating in a wireless manner.

The base station comprises a receiver as known by a skilled person. The base station may also comprise a transmitter. The receiver and the transmitter may be implemented as one single unit, for example as a transceiver 301 as shown in FIG. 3. The transceiver or the receiving unit and the transmitter may be adapted to communicate with a further base station (not shown) or the user equipments 103, 104 via an antenna.

The base station 102 comprises further a control unit 302. The control unit may be implemented for example as part of a standard control unit, like a CPU or a microcontroller, or may be implemented as a single unit.

The control unit may be adapted to provide first common channels or signals within the first system bandwidth and to provide second common channels or signals within the second system bandwidth, wherein a part of the first common channels or signals and a part of the second common channels or signals are superpositioned. This may denote that the base station controls the communication in order to handle a broadband and a narrowband communication for regular devices and MTC devices.

The base station comprises further a configuration unit 303 being adapted to configure at least one of the common channels or signals of the part of the first common channels or signals to be used by the first user equipment and the second user equipment. By configuring the communication with regular devices and MTC devices in such a way, interferences between the both systems/communications and overload may be reduced.

The control unit and the configuration unit may be part one integrated unit or may single units. They may also be part of a common control unit of the base station.

The first user equipment (UE) 103 may be any type of communication end device, which is capable of connecting with the described base station. The UE may be in particular a cellular mobile phone, a Personal Digital Assistant (PDA), a notebook computer, a printer and/or any other movable communication device.

The user equipment 103 may comprise a transceiver for transmitting and/or receiving signals to/from the base station 102. The transceiver may comprise a transmitting unit and a receiving unit. The transmitting unit may be a transmitter as known by a skilled person, and the receiving unit may be a common known receiver. The transceiver or the receiving and the transmitting unit may be adapted to communicate with the base station via an antenna.

The second user equipment (UE) 104 may also be any type of communication end device, which is capable of connecting with the described base station. The UE may be in particular a cellular mobile phone, a Personal Digital Assistant (PDA), a notebook computer, a printer and/or any other movable communication device. Further, the second user equipment may be an MTC device as described above.

The user equipment 104 may comprise a transceiver for transmitting and/or receiving signals to/from the base station 102. The transceiver may comprise a transmitting unit and a receiving unit. The transmitting unit may be a transmitter as known by a skilled person, and the receiving unit may be a common known receiver. The transceiver or the receiving and the transmitting unit may be adapted to communicate with the base station via an antenna.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the configuration unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Cell of a cellular network system
102 Base station
103 First user equipment
104 Second user equipment
200 Bandwidth overview
210 First system bandwidth (full bandwidth) channels
220 Second system bandwidth (narrow bandwidth) channels
230 Narrow bandwidth PDSCH
240 OFDM symbol
250 Full bandwidth PDCCH
260 Reference blocks
270 Narrow bandwidth PDCCH
280 PCFICH
300 Cellular network system
301 Transceiver of base station
302 Control unit of base station
303 Configuration unit of base station

The invention claimed is:

1. A method comprising:
configuring a communication between a base station, a first user equipment operating with a first system bandwidth and a second user equipment operating with a second system bandwidth, wherein the first system bandwidth is broader than the second system bandwidth and wherein the base station, the first user equipment and the second user equipment are located within a cellular network system, comprising:
providing first common channels or signals within the first system bandwidth;
providing second common channels or signals within the second system bandwidth;
configuring part of the first common channels or signals and part of the second common channels or signals to share at least one common symbol and reduce at least a control channel overhead of the cellular network system, wherein the configured part of the first common channels or signals and the configured part of the second common channels or signals are superpositioned on top of each other on the shared at least one common symbol to be used by the first user equipment and the second user equipment;
configuring at least one of the common channels or signals of the part of the first common channels to be used for the communication by the first user equipment and the second user equipment; and
allowing transmission on the second common channels or signals within a predefined duty cycle, wherein the predefined duty cycle allows transmission of the communication in only a predefined subset of all subframes of the communication.

2. The method as set forth in claim 1, the method further comprising separating the part of the first common channels or signals and the part of the second common channels or signals in time.

3. The method as set forth in claim 1, the method further comprising separating the part of the first common channels or signals and the part of the second common channels or signals in frequency.

4. The method as set forth in claim 1, wherein the first common channels or signals and the second common channels or signals each comprise at least one of the group consisting of a physical downlink control channel, a physical hybrid automatic repeat-request indicator channel, a physical control format indication channel, and a physical broadcast channel.

5. The method as set forth in claim 1, wherein the at least one of the common channels or signals of the part of the first common channels or signals to be used by the first user equipment and the second user equipment is at least one of the group consisting of a primary synchronization signal and a secondary synchronization signal.

6. The method as set forth in claim 1, wherein the superpositioning comprises the configured part of the first common channels or signals and the configured part of the second common channels or signals are superpositioned on top of each other in frequency and configured to share common physical resource blocks.

7. The method as set forth in claim 1, wherein the at least one common symbol is at least one of reference symbols included into a common reference signal or a channel state information reference signal.

8. A base station comprising: at least one processor; and at least one memory including computer program code, where the at least one memory and the computer program code are configured, with the at least one processor, to cause the base station to at least:
configure a communication between the base station, a first user equipment to operate with a first system bandwidth and a second user equipment to operate with a second system bandwidth, wherein the first system bandwidth is broader than the second system bandwidth and wherein the base station, the first user equipment and the second user equipment are located within a cellular network system,
provide first common channels or signals within the first system bandwidth and provide second common channels or signals within the second system bandwidth;
configure part of the first common channels or signals and part of the second common channels or signals to share at least one common symbol and reduce at least a control channel overhead of the cellular network system, wherein the configured part of the first common channels or signals and the configured part of the second common channels or signals are superpositioned on top of each other on the shared at least one common symbol to be used by the first user equipment and the second user equipment;
configure at least one of the common channels or signals of the part of the first common channels or signals to be used for the communication by the first user equipment and the second user equipment; and
allow transmission on the second common channels or signals within a predefined duty cycle, wherein the predefined duty cycle allows transmission of the communication in only a predefined subset of all subframes of the communication.

9. A cellular network system for configuring a communication channel between a base station and a user equipment within the cellular network system, the cellular network system comprising the base station having the at least one processor and the at least one memory performing the functions as set forth in claim 8.

10. The base station as set forth in claim 8, wherein the at least one memory including the computer program code is configured with the at least one processor to cause the base station to separate the part of the first common channels or signals and the part of the second common channels or signals in time.

11. The base station as set forth in claim 8, wherein the at least one memory including the computer program code is configured with the at least one processor to cause the base station to separate the part of the first common channels or signals and the part of the second common channels or signals in frequency.

12. The base station as set forth in claim 8, wherein the first common channels or signals and the second common channels or signals each comprise at least one of the group consisting of a physical downlink control channel, a physical hybrid automatic repeat-request indicator channel, a physical control format indication channel, and a physical broadcast channel.

13. The base station as set forth in claim 8, wherein the at least one of the common channels or signals of the part of the first common channels or signals to be used by the first user equipment and the second user equipment is at least one of the group consisting of a primary synchronization signal and a secondary synchronization signal.

14. The base station as set forth in claim 8, wherein the superpositioning comprises the configured part of the first common channels or signals and the configured part of the second common channels or signals are superpositioned on top of each other in frequency and configured to share common physical resource blocks.

15. The base station as set forth in claim 8, wherein the at least one common symbol is at least one of reference symbols included into a common reference signal or a channel state information reference signal.

16. The method as set forth in claim 1, wherein the first system is a broadband system and wherein the second system is a narrowband system, or vice versa.

* * * * *